United States Patent
Qian et al.

(10) Patent No.: US 11,816,058 B2
(45) Date of Patent: Nov. 14, 2023

(54) METHOD FOR DYNAMICALLY MODIFYING PCH PCIE ROOT PORT WHERE ONBOARD VGA IS LOCATED

(71) Applicant: INSPUR SUZHOU INTELLIGENT TECHNOLOGY CO., LTD., Jiangsu (CN)

(72) Inventors: Huijuan Qian, Jiangsu (CN); Bing Wang, Jiangsu (CN); Fanyi Yao, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/028,475

(22) PCT Filed: Apr. 26, 2021

(86) PCT No.: PCT/CN2021/089910
§ 371 (c)(1),
(2) Date: Mar. 24, 2023

(87) PCT Pub. No.: WO2022/088630
PCT Pub. Date: May 5, 2022

(65) Prior Publication Data
US 2023/0273893 A1   Aug. 31, 2023

(30) Foreign Application Priority Data
Oct. 29, 2020 (CN) .......................... 202011181774.0

(51) Int. Cl.
*G06F 13/10* (2006.01)
*G06F 13/42* (2006.01)

(52) U.S. Cl.
CPC ........ *G06F 13/4221* (2013.01); *G06F 13/102* (2013.01)

(58) Field of Classification Search
CPC . G06F 13/4221; G06F 103/102; G06F 13/102
(Continued)

(56) References Cited

U.S. PATENT DOCUMENTS 1,037,266 A * 9/1912 Kirkpatrick et al. .... A47C 7/02
297/283.1
10,133,654 B1 * 11/2018 Deiderich, III ..... G06F 11/3636
(Continued)

FOREIGN PATENT DOCUMENTS

| CN | 107147864 A | 9/2017 |
|---|---|---|
| CN | 109032623 A | 12/2018 |

(Continued)

OTHER PUBLICATIONS

PCT/CN2021/089910 international search report.

*Primary Examiner* — Christopher B Shin
(74) *Attorney, Agent, or Firm* — IPro, PLLC

(57) ABSTRACT

A method, apparatus, and device for dynamically modifying a PCH PCIE root port where an onboard VGA is located, and a readable storage medium. The current item may be determined at a PEI phase by reading a GPIO interface, and a target PCH PCIE root port used by the item is further determined; then configuration information is acquired, and a target onboard VGA is found and initialized; because a video bridge configuration file defined in an SDL file is saved in a structure of a temporary file when code is compiled, in the method, the value of a target member of the structure is modified as the port number of the target PCH PCIE root port at a DXE phase, so that a video bridge is switched to the target PCH PCIE root port.

17 Claims, 2 Drawing Sheets

--- in a PEI phase, reading a preset GPIO interface, and determining a current item according to a reading result    S101 acquiring input information to obtain configuration information corresponding to the target PCH PCE root port; and according to the configuration information, determining a target onboard VGA and initializing the target onboard VGA    S102 in a DXE phase, modifying a value of a target member of a target structural body to a port number of the target PCH PCE root port according to a modification instruction to switch a video bridge to the target PCH PCE root port    S103

(58) Field of Classification Search
USPC .......................................................... 710/105
See application file for complete search history.

(56) References Cited

U.S. PATENT DOCUMENTS

| | | | | |
|---|---|---|---|---|
| 10,402,204 B1 * | 9/2019 | Yakovlev | ............... | G06F 3/0644 |
| 10,642,623 B1 * | 5/2020 | Righi | ........................ | G06F 8/65 |
| 2021/0311747 A1 * | 10/2021 | Liao | .................... | G06F 11/2284 |

FOREIGN PATENT DOCUMENTS

| | | | | |
|---|---|---|---|---|
| CN | 110088709 A | | 8/2019 | |
| CN | 110096314 A | | 8/2019 | |
| CN | 111142956 A | | 5/2020 | |
| CN | 112131171 A | | 12/2020 | |
| CN | 112650696 A | * | 4/2021 | ............... G06F 1/04 |

* cited by examiner

METHOD FOR DYNAMICALLY MODIFYING PCH PCIE ROOT PORT WHERE ONBOARD VGA IS LOCATED

CROSS-REFERENCE TO RELATED APPLICATION

This application claims the priority of the Chinese Patent application filed on Oct. 29, 2020 before the CNIPA, China National Intellectual Property Administration with the application number of 202011181774.0, and the title of "METHOD FOR DYNAMICALLY MODIFYING PCH PCIE ROOT PORT WHERE ONBOARD VGA IS LOCATED", which is incorporated herein in its entirety by reference.

FIELD

The present application relates to the technical field of computer and, more particularly, to a method, apparatus, and device for dynamically modifying a PCH PCIE root port where an onboard VGA is located, and a readable storage medium.

BACKGROUND

An onboard video graphics array (VGA) refers to a VGA interface on a motherboard. The onboard VGA function on a server is usually provided by an ASPEED chip, which is equivalent to a video bridge. Generally, the video bridge is connected to the PCH PCIE root port. The full name of the PCH is platform controller hub, which refers to the platform controller center. The full name of PCIE is the peripheral component interconnect express, which refers to a standard for the high-speed serial computer extension bus.

On the same platform, different items usually use one PCH PCIE root port to connect to the video bridge in hardware design. However, some items may have their own designs and have to use different PCH PCIE root ports to connect to the video bridge. In this case, the basic input output system (BIOS) is required to adapt.

Currently, in the SDL file of the BIOS code, the video bridge configuration file (the file name in the code is PCI Device Video Bridge) is used to fix the PCH PCIE root port where the onboard VGA is located. If a different PCH PCIE root port is used, it is required to modify the video bridge configuration file, and the two sets of code are incompatible.

If the PCH PCIE root ports of the onboard VGA on the mainboard are designed to be different for several items on the same platform, it is required to define different PCH PCIE root ports in the video bridge configuration file during the BIOS design, and then compile and generate different BIOS files. At this time, for one platform, it is required to maintain a plurality of sets of BIOS code, when Codebase upgrade or problem synchronization is needed, it will bring a lot of work, which have negative influence on the upgrade and maintenance of the BIOS code.

It may be seen that the PCH PCIE root port where an onboard VGA is located cannot be dynamically modified in a set of BIOS code at present.

SUMMARY

An objective of the present disclosure is to provide a method, apparatus, and device for dynamically modifying a PCH PCIE root port where an onboard VGA is located, and a readable storage medium, to solve the problem that the PCH PCIE root port where an onboard VGA is located cannot be dynamically modified in a set of BIOS code at present. The solution is as follows:

In a first aspect, the present disclosure provides a method for dynamically modifying a PCH PCIE root port where an onboard VGA is located, including:

in a PEI phase, reading a preset GPIO interface, and determining a current item according to a reading result; and determining a target PCH PCIE root port corresponding to the current item;

acquiring input information to obtain configuration information corresponding to the target PCH PCIE root port; and according to the configuration information, determining a target onboard VGA and initializing the target onboard VGA; and in a DXE phase, modifying a value of a target member of a target structural body to a port number of the target PCH PCIE root port according to a modification instruction to switch a video bridge to the target PCH PCIE root port, wherein the target structural body is a structural body stored in a temporary file generated according to a video bridge configuration file when a code is compiled.

In some embodiments of the present disclosure, in the PEI phase, reading the preset GPIO interface, and determining the current item according to the reading result includes:

setting an item ID for each item of a current platform;
in the PEI phase, reading the preset GPIO interface to obtain the reading result; and
determining the item ID as an item of the reading result and regarding the item of the reading result as the current item.

In some embodiments of the present disclosure, acquiring the input information to obtain the configuration information corresponding to the target PCH PCIE root port includes:

acquiring the input information to obtain the configuration information corresponding to the target PCH PCIE root port, and the configuration information includes: a bus number, a device number and a function number.

In some embodiments of the present disclosure, before in the PEI phase, reading the preset GPIO interface, and determining the current item according to the reading result, the method further includes:

setting a value of a target parameter in the video bridge configuration file to be a port number of a default PCH PCIE root port, wherein the default PCH PCIE root port is the PCH PCIE root port that is compatible with most items in all PCH PCIE root ports of the current platform, and the target parameter generates the target member when the code is compiled.

In a second aspect, the present disclosure provides an apparatus for dynamically modifying a PCH PCIE root port where an onboard VGA is located, including:

a root port determining module configured for, in a PEI phase, reading a preset GPIO interface, and determining a current item according to a reading result; and determining a target PCH PCIE root port corresponding to the current item;

an onboard VGA initialization module configured for acquiring input information to obtain configuration information corresponding to the target PCH PCIE root port; and according to the configuration information, determining a target onboard VGA and initializing the target onboard VGA; and a root port modifying module configured for, in a DXE phase, modifying a value of a target member of a target structural body to a port number of the target PCH PCIE root port according to a modification instruction to switch a video bridge to the target PCH PCIE root port, wherein the target structural body is a structural body stored in a temporary file generated according to a video bridge configuration file when a code is compiled.

In some embodiments of the present disclosure, the root port determining module includes:

an ID setting unit configured for setting an item ID for each item of a current platform;

an ID determining unit configured for, in the PEI phase, reading the preset GPIO interface to obtain the reading result; and determining the item ID as an item of the reading result and regarding the item of the reading result as the current item.

In some embodiments of the present disclosure, the onboard VGA initialization module includes:

configuration information acquiring module configured for acquiring the input information to obtain the configuration information corresponding to the target PCH PCIE root port, and the configuration information includes: a bus number, a device number and a function number.

In some embodiments of the present disclosure, the apparatus further includes:

a default value setting unit configured for setting a value of a target parameter in the video bridge configuration file to be a port number of a default PCH PCIE root port, wherein the default PCH PCIE root port is the PCH PCIE root port that is compatible with most items in all PCH PCIE root ports of the current platform, and the target parameter generates the target member when the code is compiled.

In a third aspect, the present disclosure provides a device for dynamically modifying a PCH PCIE root port where an onboard VGA is located, including:

a memory configured for storing computer programs; and a processor configured for executing the computer programs to implement the method for dynamically modifying the PCH PCIE root port where the onboard VGA is located stated above.

In a fourth aspect, the present disclosure provides a computer-readable storage medium, wherein a computer program is stored on the computer-readable storage medium, when the computer program is executed by a processor, the computer program is configured to implement the method for dynamically modifying the PCH PCIE root port where the onboard VGA is located stated above.

The present application provides a method for dynamically modifying a PCH PCIE root port where an onboard VGA is located, the current item may be determined by reading a preset GPIO interface in a PEI phase, and then a target PCH PCIE root port used by the item is determined. Then the configuration information is obtained to find the target onboard VGA and initialize it. Since the video bridge configuration file defined in the SDL file of the BIOS code is saved in the structural body of the temporary file when the code is compiled, in the DXE phase, the target member value of the structural body is changed to be the port number of the target PCH PCIE root port, thus switching the video bridge to the target PCH PICE root port.

When the PCH PCIE root ports used by a plurality of items on the mainboard are different, it may need to amend the PCH PCIE root port where the onboard VGA is located to start different items. By using the above method, the PCH PCIE root port where the onboard VGA is located may be dynamically modified without modifying the BIOS code to make the onboard VGA display normally. There is no need for developers to make corresponding modifications to different PCH PCIE root ports, recompile code to release versions, or maintain versions for specific items. It saves the valuable time of developers, reduces the difficulty of maintenance personnel to maintain the version, and improves the usability of the server.

In addition, the present application also provides an apparatus, and device for dynamically modifying a PCH PCIE root port where an onboard VGA is located, and a readable storage medium, whose technical effects are corresponding to the technical effect of the above method and will not be described here.

BRIEF DESCRIPTION OF THE DRAWINGS

To illustrate the embodiments of the present application more clearly, a brief description will be given below of the drawings necessary for the embodiments. Apparently, the drawings in the following description are only some embodiments of the present application, and those of ordinary skill in the art may obtain other drawings based on these drawings without involving any inventive effort.

DETAILED DESCRIPTION

Figure 1:
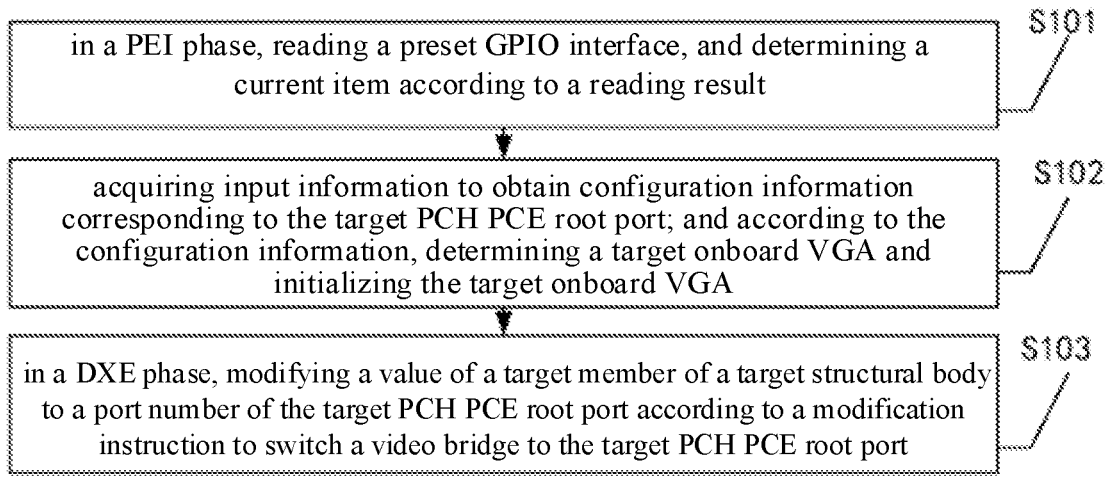
FIG. 1 is a flow chart of embodiment 1 of a method for dynamically modifying a PCH PCIE root port where an onboard VGA is located according to the present disclosure.

The core of the present disclosure is to provide a method, apparatus, and device for dynamically modifying a PCH PCIE root port where an onboard VGA is located, and a readable storage medium. The PCH PCIE root port where the onboard VGA is located may be dynamically modified without modifying the BIOS code to make the onboard VGA display normally. There is no need for developers to make corresponding modifications to different PCH PCIE root ports, recompile code to release versions, or maintain versions for specific items, which saves the valuable time of developers.

In order to make a person skilled in the art better understand the solution of the present application, the following is a further detailed description of the present application in combination with the drawing and the embodiments. Obviously, the described embodiments are only a part of the embodiments of the present application, not all of the embodiments. Based on the embodiments of the present application, all other embodiments obtained by a person skilled in the art without making creative labor belong to the scope of protection in the present application.

Embodiment 1of a method for dynamically modifying a PCH PCIE root port where an onboard VGA is located is described below. Referring FIG. 1. Embodiment 1 includes:

S101, in a PEI phase, reading a preset GPIO interface, and determining a current item according to a reading result; and determining a target PCH PCIE root port corresponding to the current item.

When designing the motherboard, several GPIO interfaces are reserved. When the mainboard is powered on and started up, the PEI phase (Pre-EFI Initialization, early EFI initialization phase) is entered, the currently started item is determined by reading these GPIO interfaces, and then the PCH PCIE root port used by this item is determined.

An item ID is set for each item of a current platform and in the PEI phase, the preset GPIO interface is read to obtain the reading result; and the item ID is determined as an item of the reading result and the item of the reading result is regarded as the current item.

S102, acquiring input information to obtain configuration information corresponding to the target PCH PCIE root port; and according to the configuration information, determining a target onboard VGA and initializing the target onboard VGA.

On the platform, different items find the onboard VGA through different PCH PCIE root ports and initialize it. After determining the PCH PCIE root port used by the current item, the onboard VGA needs to be initialized by using the PCH PCIE root port. In this process, it is necessary to obtain the configuration information of the PCH PCIE root port, such as a bus number, a device number, a function number, etc.

S103, in a DXE phase, modifying a value of a target member of a target structural body to a port number of the target PCH PCIE root port according to a modification instruction to switch a video bridge to the target PCH PCIE root port, wherein the target structural body is a structural body stored in a temporary file generated according to a video bridge configuration file when a code is compiled.

Initially, the onboard VGA is connected to the default PCH PCIE root port. In the DXE phase (Driver Execution Environment phase), the PCH PCIE root port where the onboard VGA is located is modified by code.

In an embodiment, in the BIOS code, the default PCH PCIE root port may be set to the PCH PCIE root port compatible with the most items in all PCH PCIE root ports.

The embodiment provides a method for dynamically modifying a PCH PCIE root port where an onboard VGA is located, the current item may be determined by reading a preset GPIO interface in a PEI phase, and then a target PCH PCIE root port used by the item is determined. Then the configuration information is obtained to find the target onboard VGA and initialize it. Since the video bridge configuration file defined in the SDL file of the BIOS code is saved in the structural body of the temporary file when the code is compiled, in the DXE phase, the target member value of the structural body is changed to be the port number of the target PCH PCIE root port, thus switching the video bridge to the target PCH PICE root port.

By using the above method, the PCH PCIE root port where the onboard VGA is located may be dynamically modified without modifying the BIOS code to make the onboard VGA display normally. There is no need for developers to make corresponding modifications to different PCH PCIE root ports, recompile code to release versions, or maintain versions for specific items. It saves the valuable time of developers, reduces the difficulty of maintenance personnel to maintain the version, and improves the usability of the server, enhances the quality of products, improve customer satisfaction.

Figure 2:
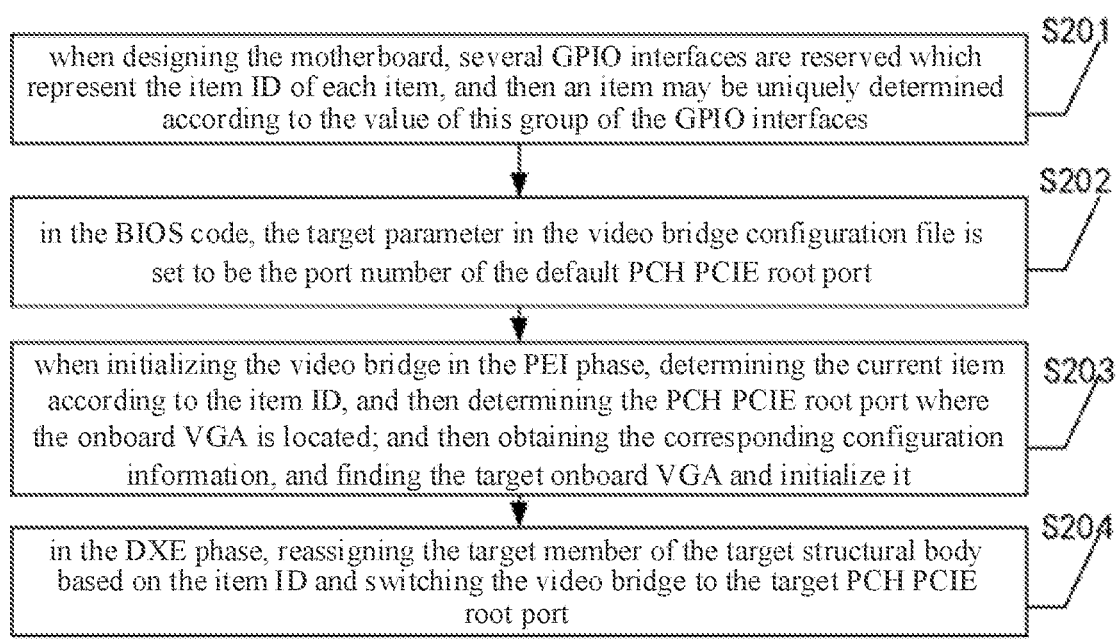
FIG. 2 is a flow chart of embodiment 2 of a method for dynamically modifying a PCH PCIE root port where an onboard VGA is located according to the present disclosure.

Embodiment 2 of a method for dynamically modifying a PCH PCIE root port where an onboard VGA is located is described below. Referring FIG. 2. Embodiment 2 includes:

S201, when designing the motherboard, several GPIO interfaces are reserved which represent the item ID of each item, and then an item may be uniquely determined according to the value of this set of GPIO interfaces.

Assuming that eight GPIOs are reserved. When the value of this set of the GPIO interfaces is 00000001 it indicates that the current started item is item 1. When the value of this set of the GPIO interfaces is 00000010, it indicates that the current started item is item 2.

S202, in the BIOS code, the target parameter in the video bridge configuration file is set to be the port number of the default PCH PCIE root port.

The video bridge configuration file contains many parameters, and the target parameter is one of them, which is used to assign the PCH PCIE root port. The default PCH PCIE root port is a PCH PCIE root port that is compatible with most items.

S203, when initializing the video bridge in the PEI phase, determining the current item according to the item ID, and then determining the PCH PCIE root port where the onboard VGA is located; and then obtaining the corresponding configuration information, and finding the target onboard VGA and initializing it.

The mainboard is powered on and started up, and the BIOS starts to run. When initializing the video bridge in the PEI phase, the current item is determined according to the item ID, and then different items find the onboard VGA by different PCH PCIE root ports, and initialize it, so that the onboard VGA may display normally in the Early VGA phase.

The configuration information includes the bus number (Bus) and the device number (Dev), the function number (Fun). The bus number and the device number and the function number filled in by different PCH PCIE root ports are different, such as, 0/0/5 is filled when the root port is root port 5, 0/0/3 is filled when the root port is root port 3. The correct configuration information is tilled here for being able to find the onboard VGA, allocate its resources and initialize the Video controller.

S204, in the DXE phase, reassigning the target member of the target structural body based on the item ID and switching the video bridge to the target PCH PCIE root port.

The video bridge configuration file defined in the SDL file of the BIOS code is saved in the structural body (that is the target structural body above) of the temporary file when the code is compiled. The PCH PCIE root port that the video bridge connects to is determined by the target member of the structural body. In the DXE phase, the target member is reassigned according to the item ID to switch the video bridge to the target PCH PCIE root port so that the onboard VGA may display normally in the POST and Runtime phases.

It may be seen that a method for dynamically modifying a PCH PCIE root port where an onboard VGA is located provided in the embodiment only needs to determine a different item ID for each item during item planning. Without modifying the BIOS code, the PCH PCIE root port where the onboard VGA is located may be dynamically modified according to the actual started item, to make the onboard VGA display normal. This approach enhances the usability and robustness of the BIOS code, enhances the compatibility of the platform code, and only one version of the code may cover all items.

An apparatus for dynamically modifying a PCH PCIE root port where an onboard VGA is located provided in the embodiment of the present disclosure is introduced below, and the apparatus for dynamically modifying the PCH PCIE root port where the onboard VGA is located described below and the method for dynamically modifying the PCH PCIE root port where the onboard VGA is located described above may refer to each other.

Figure 3:
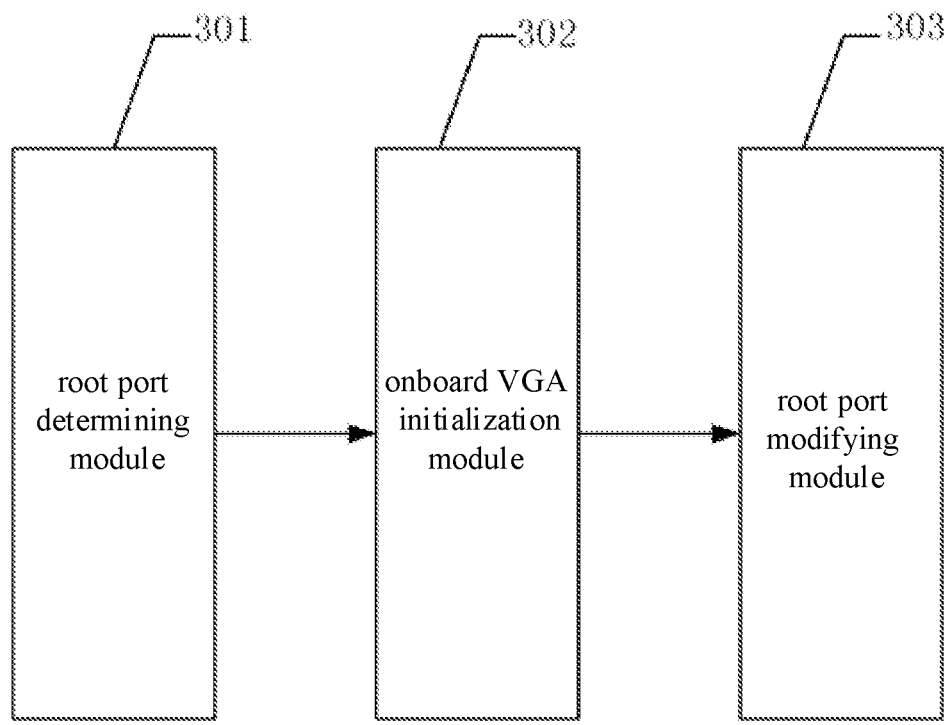
FIG. 3 is a functional block diagram of an embodiment of an apparatus for dynamically modifying a PCH PCIE root port where an onboard VGA is located according to the present disclosure.

As shown in FIG. 3, the apparatus for dynamically modifying the PCH PCIE root port where the onboard VGA is located of the embodiment, including:

a root port determining module 301 configured for, in a PEI phase, reading a preset GPIO interface, and determining a current item according to a reading result; and determining a target PCH PCIE root port corresponding to the current item;

an onboard VGA initialization module 302 configured for acquiring input information to obtain configuration information corresponding to the target PCH PCIE root port; and according to the configuration information, determining a target onboard VGA and initializing the target onboard VGA; and a root port modifying module 303 configured for, in a DXE phase, modifying a value of a target member of a target structural body to a port number of the target PCH PCIE root port according to a modification instruction to switch a video bridge to the target PCH PCIE root port, wherein the target structural body is a structural body stored in a temporary file generated according to a video bridge configuration file when a code is compiled.

In some embodiments, the root port determining module includes:

an ID setting unit configured for setting an item ID for each item of a current platform;

an ID determining unit configured for, in the PEI phase, reading the preset GPIO interface to obtain the reading result; and determining the item ID as an item of the reading result and regarding the item of the reading result as the current item.

In some embodiments, the onboard VGA initialization module includes:

configuration information acquiring module configured for acquiring the input information to obtain the configuration information corresponding to the target PCH PCIE root port, and the configuration information includes: a bus number, a device number and a function number.

In some embodiments, the apparatus further includes:

a default value setting unit configured for setting a value of a target parameter in the video bridge configuration file to be a port number of a default PCH PCIE root port, wherein the default PCH PCIE root port is the PCH PCIE root port that is compatible with most items in all PCH PCIE root ports of the current platform, and the target parameter generates the target member when the code is compiled.

An apparatus for dynamically modifying the PCH PCIE root port where the onboard VGA is located provided in the embodiment of the present disclosure is configured for implement the method for dynamically modifying the PCH PCIE root port where the onboard VGA is located, thus the implementations of the apparatus may refer to the embodiments of the method for dynamically modifying the PCH PCIE root port where the onboard VGA is located, for example, the root port determining module 301, the onboard VGA initialization module 302 and the root port modifying module 303 are configured for implement the step S101, S102 and S103 of the method for dynamically modifying the PCH PCIE root port where the onboard VGA is located, the implementations thereof may refer to the description of embodiments of each part, which is not be described here.

In addition, since the apparatus for dynamically modifying the PCH PCIE root port where the onboard VGA is located is configured for implement the method for dynamically modifying the PCH PCIE root port where the onboard. VGA is located, the effect thereof is corresponding to the effect of the above method, which is not be described here.

Furthermore, the present disclosure further provides a device for dynamically modifying a PCH PCIE root port where an onboard VGA is located, including:

a memory 100 configured for storing computer programs; and a processor 200 configured for executing the computer programs to implement the method for dynamically modifying the PCH PCIE root port where the onboard VGA is located stated above.

The memory includes at least one type of readable storage media, such as a flash memory, a hard disk, a multimedia card, a card memory, a magnetic memory, a disk, an optical disk, etc. The memory may be used not only to store application software and various data, but also to temporarily store data that has been output or will be output. In some embodiments, memory may be an internal storage unit or an external storage device.

In some embodiments, a processor may be a central processor, a controller, microcontroller, microprocessor, etc., for running program code stored in the memory.

Figure 4:
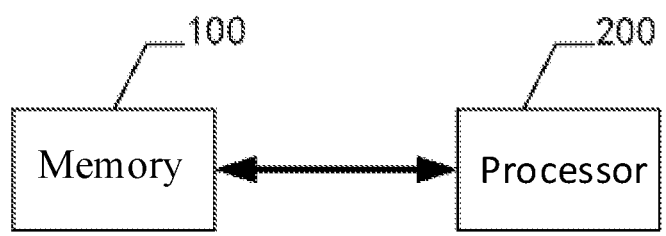
FIG. 4 is a structural schematic diagram of an embodiment of a device for dynamically modifying a PCH PCIE root port where an onboard VGA is located according to the present disclosure.

There is a bus between the memory and the processor, which may be peripheral component interconnect (PCI) bus, extended industry standard architecture (EISA) bus, etc. The bus may be divided into address bus, data bus, control bus, etc. For ease of representation, the bus is only shown by one line in FIG. 4, but it does not mean that there is only one bus or one type of bus.

Finally, the present disclosure provides a computer-readable storage medium, wherein a computer program is stored on the computer-readable storage medium, when the computer program is executed by a processor, the computer program is configured to implement the method for dynamically modifying the PCH PCIE root port where the onboard VGA is located stated above.

Various embodiments are described in the specification progressively, with each embodiment focusing on differences from the other embodiments, and with reference to one another, the embodiments have their same or similar parts explained. The system disclosed in the embodiments corresponds to the method disclosed in the embodiments, and is thus described in a relatively simple manner, that is, reference may be made to the embodiments of the method to understand the relevant parts of the system.

The steps of the method or algorithm described in combination with the embodiment described in the specification may be directly implemented by hardware, software modules executed by the processor, or a combination of the two. Software modules may be placed in random access memory (RAM), memory, read-only memory (ROM), electrically programmable ROM, electrically erasable programmable ROM, register, hard disk, removable disk, CD-ROM, or any other form of storage medium known in the art.

The above solution provided by the present application is introduced in detail. In this paper, examples are used to explain the principle and implementation of the present application. The above embodiment is only used to help understand the method of this application and its core ideas. At the same time, for the general technical personnel in the art, according to the idea of the present, there will be changes in the implementation and scope of application. In a word, the content of the specification should not be understood as a limitation of the present application.

The invention claimed is:

1. A method for dynamically modifying a platform controller hub peripheral component interconnect express (PCH PCIE) root port where an onboard video graphics array (VGA) is located, comprising:
   in a pre-extensible firmware interface initialization (PEI) phase, reading a preset general-purpose input/output (GPIO) interface, and determining a current item according to a reading result; and determining a target PCH PCIE root port corresponding to the current item, wherein the GPIO interface is read to obtain the reading result;
   acquiring input information to obtain configuration information corresponding to the target PCH PCIE root port; and according to the configuration information, determining a target onboard VGA and initializing the target onboard VGA, wherein the configuration information comprises: a bus number, a device number and a function number; and
   in a driver execution environment (DXE) phase, modifying a value of a target member of a target structural body to a port number of the target PCH PCIE root port according to a modification instruction to switch a video bridge to the target PCH PCIE root port, wherein the target structural body is structural body stored in a temporary file generated according to a video bridge configuration file when a code is compiled a structural body stored in a temporary file generated according to a video bridge configuration file when a code is compiled.

2. The method according to claim 1, wherein in the PEI phase, reading the preset GPIO interface, and determining the current item according to the reading result comprises:
   setting an item ID for each item of a current platform; and
   in the PEI phase, reading the preset GPIO interface to obtain the reading result; and
   determining the item ID as an item of the reading result and regarding the item of the reading result as the current item.

3. The method according to claim 1, wherein before in the PEI phase, reading the preset GPIO interface, and determining the current item according to the reading result, the method further comprises:
   setting a value of a target parameter in the video bridge configuration file to be a port number of a default PCH PCIE root port, wherein the default PCH PCIE root port is the PCH PCIE root port that is compatible with most items in all PCH PCIE root ports of the current platform, and the target parameter generates the target member when the code is compiled.

4. A device for dynamically modifying a PCH PCIE root port where an onboard VGA is located, comprising:
   a memory configured for storing computer programs; and
   a processor configured for executing the computer programs to implement the method for dynamically modifying the PCH PCIE root port where the onboard VGA is located according to claim 1.

5. A computer-readable storage medium, wherein a computer program is stored on the computer-readable storage medium, when the computer program is executed by a processor, the computer program is configured to implement the method for dynamically modifying the PCH PCIE root port where the onboard VGA is located according to claim 1.

6. The method according to claim 1, wherein after determining the target PCH PCIE root port corresponding to the current item, the onboard VGA is initialized by using the target PCH PCIE root port.

7. The method according to claim 1, wherein in the DXE phase, the PCH PCIE root port where the onboard VGA is located is modified by code.

8. The method according to claim 2, wherein on the current platform, different items find the onboard VGA through different PCH PCIE root ports and initialize the onboard VGA.

9. The device according to claim 4, wherein in the PEI phase, reading the preset GPIO interface, and determining the current item according to the reading result comprises:
   setting an item ID for each item of a current platform; and
   in the PEI phase, reading the preset GPIO interface to obtain the reading result; and
   determining the item ID as an item of the reading result and regarding the item of the reading result as the current item.

10. The device according to claim 4, wherein before in the PEI phase, reading the preset GPIO interface, and determining the current item according to the reading result, the method further comprises:
    setting a value of a target parameter in the video bridge configuration file to be a port number of a default PCH PCIE root port, wherein the default PCH PCIE root port is the PCH PCIE root port that is compatible with most items in all PCH PCIE root ports of the current platform, and the target parameter generates the target member when the code is compiled.

11. The device according to claim 4, wherein after determining the target PCH PCIE root port corresponding to the current item, the onboard VGA is initialized by using the target PCH PCIE root port.

12. The device according to claim 4, wherein in the DXE phase, the PCH PCIE root port where the onboard VGA is located is modified by code.

13. The device according to claim 9, wherein on the current platform, different items find the onboard VGA through different PCH PCIE root ports and initialize the onboard VGA.

14. The computer-readable storage medium according to claim 5, wherein in the PEI phase, reading the preset GPIO interface, and determining the current item according to the reading result comprises:
    setting an item ID for each item of a current platform; and
    in the PEI phase, reading the preset GPIO interface to obtain the reading result; and determining the item ID as an item of the reading result and regarding the item of the reading result as the current item.

15. The computer-readable storage medium according to claim 5, wherein before in the PEI phase, reading the preset GPIO interface, and determining the current item according to the reading result, the method further comprises:
    setting a value of a target parameter in the video bridge configuration file to be a port number of a default PCH PCIE root port, wherein the default PCH PCIE root port is the PCH PCIE root port that is compatible with most items in all PCH PCIE root ports of the current platform, and the target parameter generates the target member when the code is compiled.

16. The computer-readable storage medium according to claim 5, wherein after determining the target PCH PCIE root port corresponding to the current item, the onboard VGA is initialized by using the target PCH PCIE root port.

17. The computer-readable storage medium according to claim 5, wherein in the DXE phase, the PCH PCIE root port where the onboard VGA is located is modified by code.

\* \* \* \* \*